United States Patent
Baskin

(10) Patent No.: US 10,161,441 B2
(45) Date of Patent: Dec. 25, 2018

(54) SELF-LUBRICATED BEARINGS

(71) Applicant: Sikorsky Aircraft Corporation, Stratford, CT (US)

(72) Inventor: Bryan K. Baskin, Arlington, TX (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 24 days.

(21) Appl. No.: 15/340,236

(22) Filed: Nov. 1, 2016

(65) Prior Publication Data

US 2018/0119729 A1    May 3, 2018

(51) Int. Cl.
| | |
|---|---|
| *F16C 11/06* | (2006.01) |
| *F16C 33/24* | (2006.01) |
| *B64C 27/14* | (2006.01) |
| *F16C 33/10* | (2006.01) |
| *F16C 33/12* | (2006.01) |

(52) U.S. Cl.
CPC ............ *F16C 11/068* (2013.01); *B64C 27/14* (2013.01); *F16C 11/0614* (2013.01); *F16C 33/1095* (2013.01); *F16C 33/121* (2013.01); *F16C 33/24* (2013.01); *F16C 2202/22* (2013.01); *F16C 2204/42* (2013.01); *F16C 2204/60* (2013.01); *F16C 2206/00* (2013.01); *F16C 2223/30* (2013.01); *F16C 2326/43* (2013.01)

(58) Field of Classification Search
CPC . F16C 11/068; F16C 11/0604; F16C 11/0614; F16C 23/043; F16C 33/25; F16C 2204/60; F16C 2202/50; F16C 33/24; B64C 27/32; B64C 27/48; B64C 27/14

USPC ......... 384/13, 129, 192, 206, 208, 213, 279, 384/282, 322, 42; 29/898.051, 898.061, 29/898.07; 416/134 A

See application file for complete search history.

(56) References Cited

U.S. PATENT DOCUMENTS

| | | | | | |
|---|---|---|---|---|---|
| 2,324,676 | A | * | 7/1943 | Butterfield | F16C 17/22 384/278 |
| 2,400,506 | A | * | 5/1946 | Heim | F16C 11/0614 16/DIG. 27 |
| RE27,778 | E | * | 10/1973 | Potter et al. | B21D 53/10 29/898.051 |
| 5,596,597 | A | * | 1/1997 | Nishida | H01S 3/02 372/107 |
| 8,511,997 | B2 | * | 8/2013 | Cunningham | F16F 1/40 267/141.1 |
| 2002/0073547 | A1 | * | 6/2002 | Sasaki | F16C 23/045 29/898.061 |
| 2005/0036722 | A1 | * | 2/2005 | Sato | F16C 23/045 384/192 |

(Continued)

FOREIGN PATENT DOCUMENTS

| | | | | | |
|---|---|---|---|---|---|
| CA | 2662833 | A1 | * | 2/2008 | ............ B64C 27/32 |
| CA | 2889319 | A1 | * | 1/2016 | ........... B64C 11/325 |

(Continued)

*Primary Examiner* — Marcus Charles
(74) *Attorney, Agent, or Firm* — Cantor Colburn LLP

(57) ABSTRACT

An aircraft includes an airframe and a rotary component rotatably connected to the airframe by way of a plain bearing. The rotary component is part of a rotorcraft control system. The plain bearing includes an inner member rotatably engaged in at least two axes of rotation to an outer member. The inner member has a coefficient of thermal expansion (CTE) substantially less than that of the outer member.

18 Claims, 1 Drawing Sheet

(56) References Cited

U.S. PATENT DOCUMENTS

| | | | |
|---|---|---|---|
| 2007/0292062 A1* | 12/2007 | Arnold | F16C 23/04 384/206 |
| 2008/0104845 A1* | 5/2008 | Lee | B29C 33/60 29/898.043 |
| 2009/0142010 A1* | 6/2009 | Ito | F16C 33/107 384/279 |
| 2009/0275685 A1* | 11/2009 | Hamel | C09D 4/00 524/404 |
| 2012/0141052 A1* | 6/2012 | Drew | F16C 23/045 384/13 |
| 2012/0294557 A1* | 11/2012 | Soelch | C09D 147/00 384/282 |
| 2015/0184540 A1 | 7/2015 | Winkler et al. | |
| 2016/0229524 A1* | 8/2016 | Huynh | B64C 9/00 |

FOREIGN PATENT DOCUMENTS

| | | | | |
|---|---|---|---|---|
| EP | 2674633 A1 | * | 12/2013 | F16C 23/043 |
| GB | 166709 A | * | 7/1921 | F16C 17/06 |
| GB | 1120686 A | * | 7/1968 | B29C 45/14 |

* cited by examiner

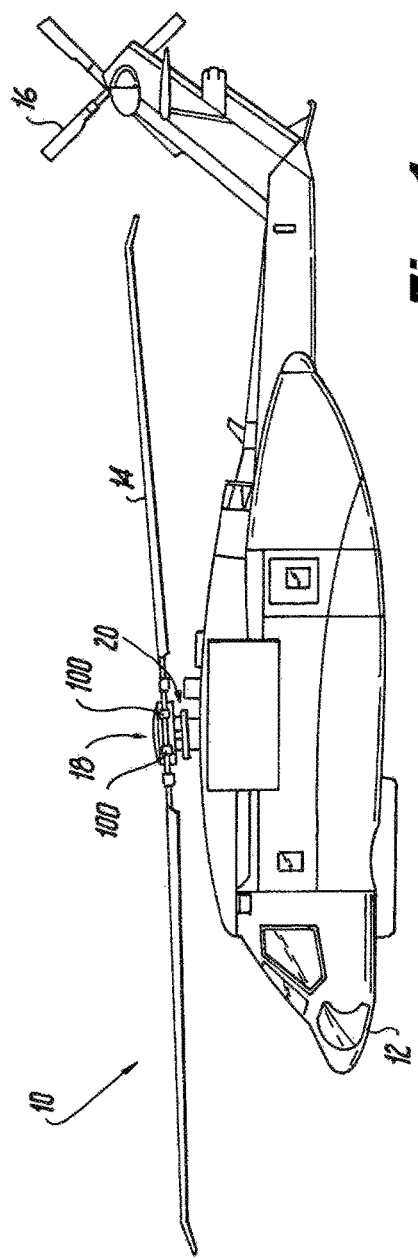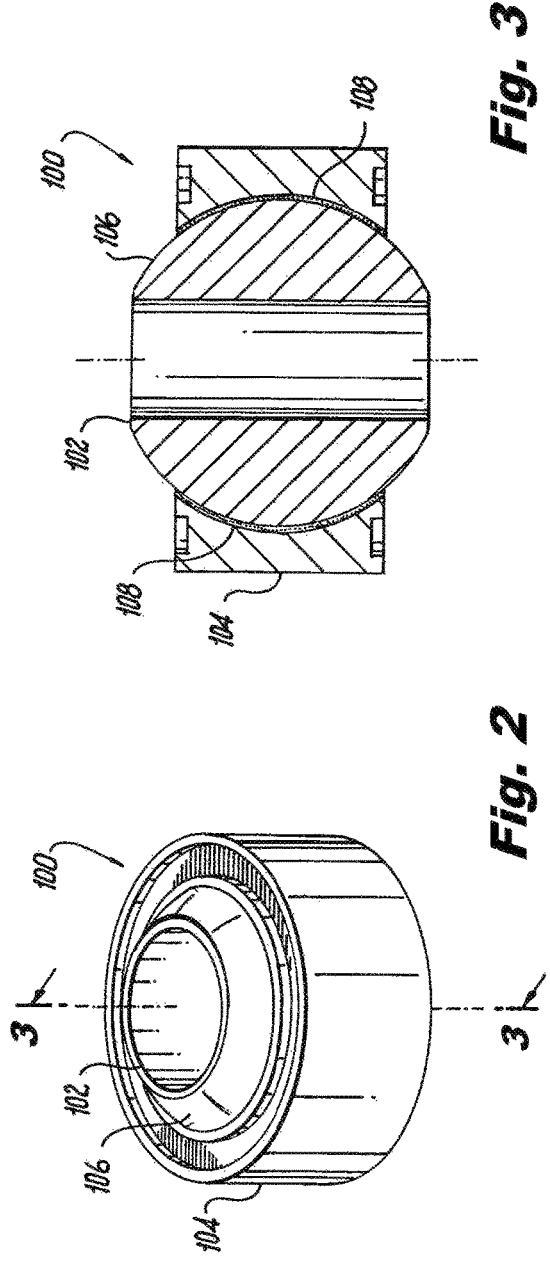

SELF-LUBRICATED BEARINGS

BACKGROUND OF THE INVENTION

1. Field of the Invention

The present disclosure relates to bearings, and more particularly to self-lubricated bearings such as used in aerospace applications.

2. Description of Related Art

Self-lubricated bearings are used in helicopter control systems. In particular, some rotor control systems, where motions and speeds are relatively high, include self-lubricated bearings. Traditional bearings involve inner members rotating against either a fabric or composite self-lubricated liner. Some of these composite liners are not durable when there is a clearance condition in the bearing. So these manufacturers tend to produce bearings with zero gap between the inner member and the liner. As the inner member heats more quickly than the outer member due to motion, the pressure on the liner increases, and thus the forces and temperatures increase, leading to thermally induced shortened life.

Such conventional methods and systems have generally been considered satisfactory for their intended purpose. However, there is still a need in the art for improved bearings. The present disclosure provides a solution for this need.

SUMMARY OF THE INVENTION

A plain bearing includes an inner member rotatably engaged in at least two axes of rotation to an outer member. The inner member has a coefficient of thermal expansion (CTE) substantially less than that of the outer member.

The inner member can be coated with a coating such as a ceramic material and/or hard chrome. The inner member can include a steel alloy, such as an Invar alloy. The CTE of the inner member can be less than or equal to 3 in/(in° F.) (or 1.67 cm/(cm° K.)).

The inner member and the outer member can form a self-lubricating bearing. The outer member can include a lining in contact with the inner member. The lining can include at least one of a PTFE, fabric, or a composite.

An aircraft includes an airframe and a rotary component rotatably connected to the airframe by way of a plain bearing as described in any embodiment above. The rotary component can part of a rotorcraft control system.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a perspective view of an exemplary embodiment of an aircraft constructed in accordance with the present disclosure, showing rotary components connected with plain bearings;

FIG. 2 is a perspective view of a bearing of FIG. 1, showing the inner and outer members; and FIG. 3 is a cross-sectional elevation view of the bearing of FIG. 2, showing the inner and outer members.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an exemplary embodiment of a bearing in accordance with the disclosure is shown in FIG. 1 and is designated generally by reference character 100. Other embodiments of bearings in accordance with the disclosure, or aspects thereof, are provided in FIGS. 2-3, as will be described. The systems and methods described herein can be used to improve bearing performance, e.g. in high speed rotary components for aerospace applications.

Aircraft 10 is a helicopter and includes an airframe 12, main rotor 14, and tail rotor 16. Main rotor 14 is driven about its main rotor shaft 18, which is in turn driven by a powertrain system. Rotary components 20 are rotatably connected to the airframe 12 directly or indirectly by way of plain bearings 100. The rotary components 20 are part of a rotorcraft control system, i.e. for collective and cyclic control of main rotor 14. However, those skilled in the art will readily appreciate that the positions shown for plain bearings 100 in FIG. 1 are exemplary only, and that plain bearings can be used throughout aircraft 10, or in any other non-aircraft application, without departing from the scope of this disclosure.

With reference now to FIG. 2, the plain bearing 100 includes an inner member 102 rotatably engaged in at least two axes of rotation, e.g. axes A and B, to an outer member 104. Any suitable material can be used for outer member 104, such as Ph13-8 stainless steel for example, which has a coefficient of thermal expansion (CTE) of about 6 ppm/° F. (11 ppm/° C.). Other suitable steel materials include 440C, which has a CTE of 5.6 ppm/° F. (10.1 ppm/° C.), 4340, which has a CTE of about 7 ppm/° F. (12.5 ppm/° C.), 51200, which has a CTE of about 6.5 ppm/° F. (11.7 ppm/° C.), or the like. It is also contemplated that titanium alloys can be used for the outer member 104, which have CTEs of about 5 ppm/° F. (9 ppm/° C.). It is also contemplated that Inconel, which has a CTE of 6.4 ppm/° F. (11.5 ppm/° C.), or other nickel based alloys, which have CTEs of about 7.5 ppm/° F. (13.4 ppm/° C.), can be used for the outer member 104.

The inner member 102 has a CTE substantially less than that of the outer member 104, e.g., wherein the difference in CTEs between the inner and outer members 102 and 104 is greater than that for steel and titanium. The inner member 102 is coated with a coating 106 that includes a ceramic material, hard chrome, and/or any other suitable material. The inner member 102 includes a steel alloy, such as an Invar alloy, which has a CTE of about 0 to 1.1 ppm/° F. (0 to 2 ppm/° C.). The CTE of the inner member is therefore less than or equal to 3 ppm/° F. (or 1.67 ppm/° C.)). In other words, the ratio of CTE of outer member 104 to the CTE of inner member 102 can range from about 1.67 to about 7.5, with a ratio of about 5.0 being typical of having an outer member 104 with a CTE of about 5.5 ppm/° F. (9.9 ppm/° C.) and an inner member with a CTE of about 1.1 ppm/° F. (2 ppm/° C.) over an operating range of 0° C. to 200° C., for example. Referring now to FIG. 3, the inner member 102 and the outer member 104 form a self-lubricating bearing. The outer member 104 includes a lining 108 in contact with the inner member 102. The lining includes at least one of a PTFE, fabric or a composite material.

Outer member 104 tends heat up slower than inner member 102. In traditional bearings, this leads to the inner member being squeezed, resulting in shortened bearing life. However, in accordance with this disclosure, using a steel alloy with a low coefficient of thermal expansion (such as Invar compositions) as the inner member 102, an inner member 102 can be designed to grow equally to the outer member 104 during thermal expansion despite a temperature difference between the races and thus maintaining near zero clearance. Because Invar is only of modest strength and hardness, a hard chrome and/or ceramic hard coat, e.g., coating 106, can be applied to provide the necessary surface hardness for long life. It is also contemplated that the inner member 102 can be designed so that as the bearing system heats up, a slight gap opens, reducing the friction pressures that generate the heating in the first place.

Benefits of bearings as disclosed herein include being able to control the pressures that get generated in a zero clearance bearing as the inner member heats faster than the outer member. Either a longer life can be achieved or a less expensive liner technology can be employed, saving end user operating cost and enabling this type of bearing to be used in more applications. Where suitable, a self-lubricated plain bearing is typically the lightest and most compact option available.

While shown and described in the exemplary context of plain bearings with at least two degrees or axes of freedom, those skilled in the art will readily appreciate that any other suitable type of bearing can be used without departing from the scope of this disclosure. For example, bearings rotatable about on only one axis, such as plain journal bearings, can include CTE's and materials as described herein and obtain similar benefits.

The methods and systems of the present disclosure, as described above and shown in the drawings, provide for bearings with superior properties including improved thermal performance for longer life. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A plain bearing comprising:
an outer member;
an inner member rotatably engaged in at least two axes of rotation to the outer member, the inner member having a first coefficient of thermal expansion (CTE) and the outer member having a second coefficient of thermal expansion (CTE), the first coefficient of thermal expansion being substantially less than the second coefficient of thermal expansion; and
a coating formed about an exterior surface of the inner member.

2. The plain bearing as recited in claim 1, wherein the coating includes at least one of a hard chrome or a ceramic material.

3. The plain bearing as recited in claim 1, wherein the inner member includes a steel alloy.

4. The plain bearing as recited in claim 3, wherein the steel alloy includes an Invar alloy.

5. The plain bearing as recited in claim 1, wherein the CTE of the inner member is less than or equal to 3 in/(in° F.) (or 1.67 cm/(cm° K)).

6. The plain bearing as recited in claim 1, wherein the inner member and the outer member form a self-lubricating bearing.

7. The plain bearing as recited in claim 1, wherein the outer member includes a lining in contact with the inner member.

8. The plain bearing as recited in claim 1, wherein the lining includes at least one of a PTFE, fabric, or a composite.

9. An aircraft comprising:
an airframe;
a rotary component rotatably connected to the airframe by way of a plain bearing, wherein the plain bearing includes:
an outer member;
an inner member rotatably engaged in at least two axes of rotation to an outer member, the inner member having a first coefficient of thermal expansion (CTE) and the outer member having a second coefficient of thermal expansion (CTE), the first coefficient of thermal expansion being substantially less than the second coefficient of thermal expansion; and
a coating formed about an exterior surface of the inner.

10. The aircraft as recited in claim 9, wherein the rotary component is part of a rotorcraft control system.

11. The aircraft as recited in claim 9 wherein the inner member is coated with a coating that includes at least one of a hard chrome or a ceramic material.

12. The aircraft as recited in claim 9, wherein the inner member includes a steel alloy.

13. The aircraft as recited in claim 12, wherein the steel alloy includes an Invar alloy.

14. The aircraft as recited in claim 9, wherein the CTE of the inner member is less than or equal to 3 in/(in° F.) (or 1.67 cm/(cm° K)).

15. The aircraft as recited in claim 9, wherein the inner member and the outer member form a self-lubricating bearing.

16. The aircraft as recited in claim 9, wherein the outer member includes a lining in contact with the inner member.

17. The aircraft as recited in claim 9, wherein the lining includes at least one of a PTFE, fabric, or a composite.

18. A bearing comprising:
an outer member;
an inner member rotatably engaged in at least one axis of rotation to an outer member, the inner member having a first coefficient of thermal expansion (CTE) and the outer member having a second coefficient of thermal expansion (CTE), the first coefficient of thermal expansion being substantially less than the second coefficient of thermal expansion; and
a coating formed about an exterior of the inner member.

* * * * *